Patented Mar. 28, 1939

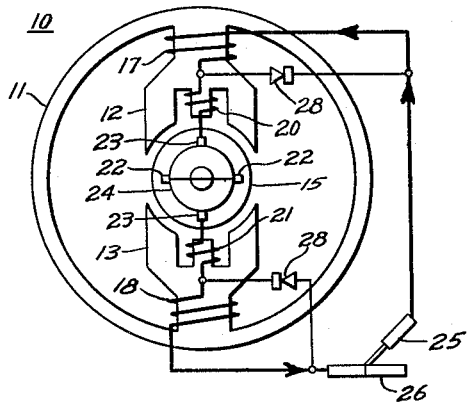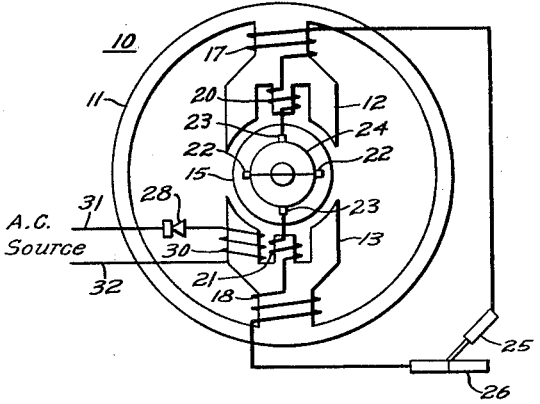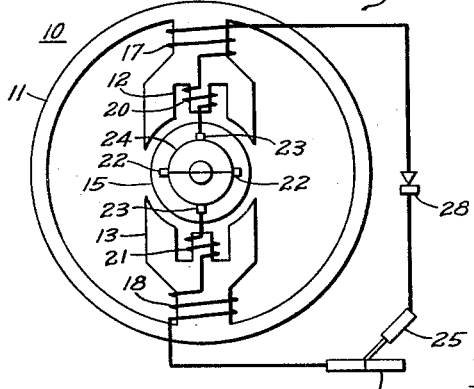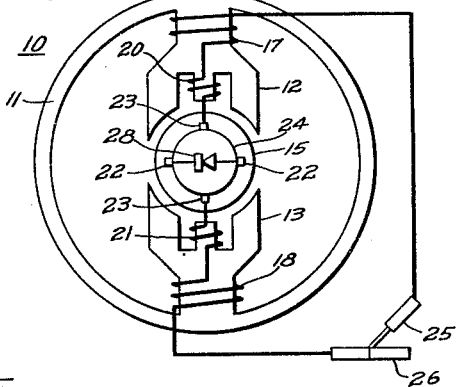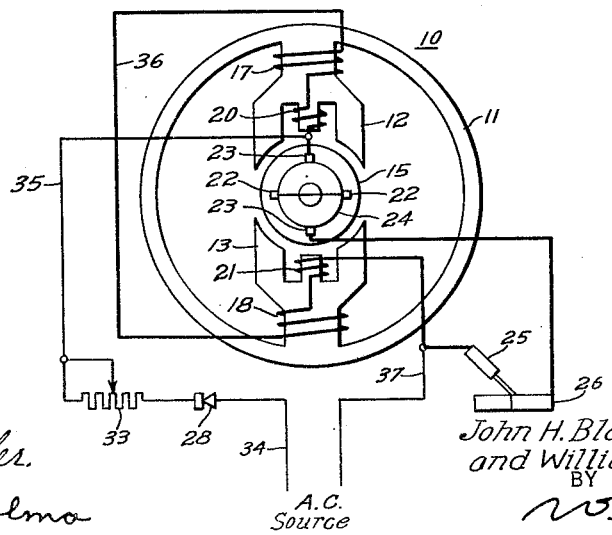

2,151,678

UNITED STATES PATENT OFFICE 2,151,678

DIRECT CURRENT WELDING GENERATOR

John H. Blankenbuehler, Edgewood, and William R. Harding, Pittsburgh, Pa., assignors to Westinghouse Electric & Manufacturing Company, East Pittsburgh, Pa., a corporation of Pennsylvania Application September 23, 1936, Serial No. 102,066

8 Claims. (Cl. 171—312)

Our invention relates generally to welding systems and it has reference in particular to a device for protecting a welding generator of the cross field type from accidental reversal of polarity.

Welding generators of the cross field type, such for example as that disclosed by the Blankenbuehler Patent 1,979,665, dated November 6, 1934, are becoming widely used in the welding industry. Their stable arc characteristics, low open circuit voltage, and simplicity of operation have led to such a widespread use that a welding generator of the cross field type may often be found in the field alongside machines of other types and voltages.

It has been discovered that when a welding generator of the cross field type is running idle and its electrode comes in contact with that of a machine of higher open circuit voltage, a circulating current is caused to flow between the two machines in the reverse direction to the normal load current of the cross field type of generator, because of the difference in terminal voltage. This reverse current tends to neutralize the residual magnetism of the field poles and often reverses the polarity of the machine.

As it is essential in direct current arc welding to be assured of the polarity of the welding generator in order to produce clean, sound welds, it is therefore important that a machine of the cross field type be protected against such accidental reversal of polarity when it is being used with welding generators of other types.

It is, therefore, an object of our invention to utilize a uni-directional current device to prevent accidental reversal of the polarity of a cross field type of welding generator.

Another object of our invention is to provide rectifier means for automatically shunting any reverse load current around the field pole windings of a dynamo electric machine of the cross field type to prevent reversal of the field pole flux.

Still another object of our invention is to provide rectifier means of the copper oxide disc type in the short circuited armature circuit of a cross field type of welding generator to maintain correct polarity at the generator terminals.

A further object of our invention is to provide a separately excited winding on a portion of a field pole member of a cross field type of direct current generator energized from an alternating current source through rectifier means to prevent reversal of the residual magnetism of said field pole members.

Other objects will in part be obvious, and in part appear hereinafter.

Accordingly, our invention is disclosed in the embodiments hereof set forth in the accompanying drawing, and comprises the features of construction, combination of elements, and arrangement of parts which will be exemplified in the construction hereinafter set forth, and in the scope of the application, which will be indicated in the appended claims.

For a further and more complete understanding of the nature and scope of our invention, reference may be had to the following detailed description, taken in connection with the accompanying drawing, in which Figure 1 is a diagrammatic view of an embodiment of our invention in a welding circuit with a welding generator of the cross field type.

Fig. 2 is a diagrammatic view of a different embodiment of our invention utilizing a separate source of auxiliary excitation.

Fig. 3 is a diagrammatic view of another alternative form of an embodiment of our invention.

Fig. 4 is a diagrammatic view of yet another embodiment of our invention in a welding circuit, and Fig. 5 is a diagrammatic view of an alternative form of our invention as shown in Fig. 2.

Referring more particularly to Fig. 1, the reference numeral 10 indicates generally a welding generator of the cross field type, the details and particulars of operation of which are set forth in the Blankenbuehler Patent 1,979,665, issued November 6, 1934.

The welding generator 10 may comprise a circular frame member 11 having oppositely positioned pole members 12 and 13 secured within the frame, and having an armature 15 rotatably mounted between the pole members. Main series field windings 17 and 18 are disposed on the pole members 12 and 13, respectively, and compensating windings 20 and 21 are positioned in slots in the face of the pole members 12 and 13. A pair of short circuited auxiliary brushes 22 and a pair of main brushes 23 are disposed at right angles to each other on the commutator 24 of the armature 15. The main brushes 23 are connected in series circuit relation with the compensating windings 20 and 31, the main field pole series windings 17 and 18, the electrode 25, and work 26.

To prevent reversal of polarity of the pole members 12 and 13, rectifier devices 28 may be connected in shunt circuit relation with the main field pole windings 17 and 18, respectively. The polarity of these rectifier devices is disposed to be such that under normal operation of the welding generator, the rectifier devices 28 present a very high resistance to the current flow in the direction as indicated by the solid arrow in Figure 1. Should, however, the welding generator 10 be running idle and the electrode 25 accidentally come in contact with the electrode of a machine of higher open circuit voltage (not shown), the two welding machines would then be connected in parallel. The higher open circuit voltage of the other welding generator would then tend to force a circulating current in the reverse direction to the normal flow of load current for the welding generator 10. Under this condtiion, the rectifier devices 28 afford a low resistance path to the flow of such current, thus effectively bypassing the reverse current about the main field pole windings 17 and 18, so that the residual magnetism of the field pole members 12 and 13 is not reversed by the reversal of current.

In Fig. 2, another form of our invention is illustrated, showing a welding circuit of the same type as Fig. 1, with the exception that the rectifier device 28 is disposed to be connected in a separate exciting circuit having an auxiliary winding 30 disposed about a portion of the main field pole 13. This circuit may be connected to an alternating current source through the conductors 31 and 32 and thus provide a source of excitation of constant polarity for the field pole 13, effectively neutralizing any attempt of a reverse current through the field pole windings 17 and 18 to reverse the residual magnetism of the field pole members.

In another embodiment of our invention as shown in Fig. 3, a rectifier device 28 may be connected in series circuit relation with the welding electrode 25 thereby effectively preventing reversal of the load current under any conditions, and hence preventing all possibility of reversal of the residual magnetism of the field poles.

In Fig. 4, an embodiment of our invention is shown wherein a rectifying device 28 may be connected in series circuit relation with the short circuited auxiliary brushes 22. The main load current of a welding generator of the cross field type is induced in the conductors of the armature 15 by their cutting a flux set up in the faces of the pole members 12 and 13 by the short circuit current between the auxiliary brushes 22. By placing a rectifier device 28 between the auxiliary brushes 22, any reversal of this load excitation flux is effectively prevented and hence a reversal of the machine polarity cannot occur.

In Fig. 5, an alternative form of our invention as shown in Fig. 2 is illustrated. In this embodiment of our invention, the field windings of the machine are connected across an alternating current source in series with a variable resistor 33 and rectifier 28. This connection insures a constant source of auxiliary excitation for all the main field pole windings through conductor 34, rectifier device 28, resistor 33, conductor 35, compensating winding 20, main series winding 17, conductor 36, main series winding 18, compensating winding 21 and conductor 37, thus maintaining the polarity of the field pole flux under all conditions.

It may, therefore, be seen that in the foregoing combinations of a rectifier device with a dynamo electric machine of the cross-field type, we have disclosed new and useful combinations of such devices which are simple to utilize and efficient, positive in operation, and of value to the welding industry in providing positive prevention of polarity reversal for a welding generator of the cross-field type.

Since certain changes may be made in the foregoing construction, and different embodiments of the invention may be made without departing from the spirit thereof, it is intended that all the matter contained in the foregoing description, or shown in the accompanying drawing shall be considered as illustrative, and not in a limiting sense.

We claim as our invention:

1. In a generator of the cross-field type, an armature having main and auxiliary brushes, circuit means for connecting the auxiliary brushes, a pair of oppositely disposed field pole members within a frame, a winding disposed about each pole member in series circuit relation with a load circuit, and rectifier means disposed in shunt circuit relation with a pole winding to prevent reversal of the direction of flow of current in the auxiliary brush circuit upon reversal of the load current by shunting said reversed load current about said pole winding.

2. In combination, a generator of the cross-field type having a pair of oppositely positioned pole members with series excitation windings disposed thereon, an auxiliary winding on one pole member, an armature having main and auxiliary brushes, circuit means for connecting the auxiliary brushes, and means including a source of alternating current, rectifier means connected in series with the auxiliary winding to supply an exciting current of fixed polarity to said winding for ensuring a predetermined direction of flow of no load cross magnetizing armature current between the auxiliary brushes.

3. The combination, in a generator of the cross-field type, having a pair of oppositely disposed pole members, windings disposed upon said pole members in series circuit relation with a load and an armature having main and auxiliary brush circuits, of means including a rectifier and control resistor for connecting said windings to an alternating current source to provide an auxiliary excitation current of fixed polarity thereto for ensuring a predetermined direction of flow of cross magnetizing armature current in the auxiliary brush circuit under no load conditions.

4. A power system comprising, in combination, a generator of the cross-field type having oppositely disposed field pole members positioned within a frame and an armature rotatably associated therewith, main and auxiliary brushes associated with the armature, series field windings disposed on said pole members, terminal members connected with said series field windings and main brushes for connection to an external circuit, and an auxiliary excitation circuit including a rectifier and an alternating-current source for providing an unvarying flow of auxiliary excitation current through said series field winding in a given direction without altering the operating characteristics of the machine for restoring the normal direction of cross-magnetizing current flow between the auxiliary brushes after a reversal of the main excitation current.

5. A generator of the cross-field type comprising, an armature with main and auxiliary brushes, circuit means for connecting the auxiliary brushes to provide a path for a no-load cross-magnetizing armature current, a pair of field pole members having excitation windings thereon, and means including a unidirectional current device connected with one of the excitation windings for ensuring a predetermined direction of flow of cross-magnetizing armature current in the auxiliary brush circuit under no-load conditions.

6. A generator of the cross-field type, comprising, an armature having main and auxiliary brushes, circuit means for connecting the auxiliary brushes, a pair of field pole members having excitation windings disposed thereon, terminal members disposed to be connected with certain of the excitation windings for connection to an external circuit, and a unidirectional current device connected with at least one of the excitation windings for ensuring restoration of the normal open circuit direction of flow of current in the auxiliary brush circuit subsequent to disconnection of the terminal members from the external circuit.

7. The combination in a generator of the cross-field type, of a pair of field pole members, an armature having main and auxiliary brushes, excitation windings disposed upon the armature and field pole members, terminal members for connection to an external circuit, circuit means for connecting the auxiliary brushes to provide a closed circuit path through an armature winding for a no-load cross-field excitation current for inducing an open circuit voltage across the terminal members, rectifier means connected in series circuit relation with one of the excitation windings for preventing reversal of the direction of current flow in the winding in order to maintain a predetermined direction of flow of no-load cross-field armature excitation current.

8. The combination with a cross-field generator having an armature with main and auxiliary brushes, circuit means for providing a closed circuit path between the auxiliary brushes for a no-load cross-field magnetizing current, series field windings connected with the main brushes, terminal connections for connection to an external circuit, of means for restoring the normal open circuit terminal polarity of the generator after reversal thereof by connection to an external circuit of higher open circuit voltage including a unidirectional current device and a source of alternating current power for providing a supply of auxiliary excitation to the series field winding for ensuring a predetermined direction of flow of the no-load cross-magnetizing current in the auxiliary brush circuit.

JOHN H. BLANKENBUEHLER.
WILLIAM R. HARDING.